United States Patent Office
3,825,529
Patented July 23, 1974

3,825,529
α-PHOSPHONOACETYLPENICILLINS
Joseph Edward Dolfini, North Brunswick, N.J., and Hermann Breuer, Burgweinting, Germany, assignors to E. R. Squibb & Sons, Inc., New York, N.Y.
No Drawing. Filed Feb. 22, 1971, Ser. No. 117,730
Int. Cl. C07d 99/16
U.S. Cl. 260—239.1                11 Claims

ABSTRACT OF THE DISCLOSURE

α-Phosphonoacetylpenicillins of the general formula

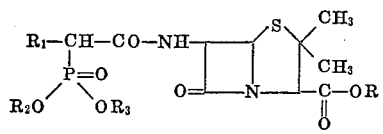

wherein R is hydrogen, lower alkyl, aralkyl, a salt forming ion or the group

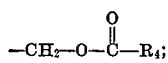

$R_1$ is hydrogen, lower alkyl, aralkyl, aryl or a heterocyclic group; $R_2$ and $R_3$ each is hydrogen, a salt forming ion, lower alkyl, aryl or aralkyl; and $R_4$ is lower alkyl, aryl or aralkyl, are useful as anti-bacterial agents.

SUMMARY OF THE INVENTION

This invention relates to new α-phosphonoacetylpenicillins of the formula (I)
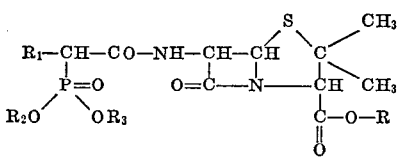

R represents hydrogen, lower alkyl, aralkyl, a salt-forming ion or the group

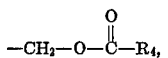

$R_1$ represents hydrogen, aryl, lower alkyl, aralkyl or a heterocyclic group; $R_2$ and $R_3$, which may be the same or different, each represents hydrogen, a salt forming ion, lower alkyl, aryl or aralkyl; $R_4$ represents lower alkyl, aryl or aralkyl.

The preferred members within each group are as follows: R is hydrogen, lower alkyl, alkali metal or

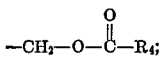

especially hydrogen, methyl, pivaloyloxy, sodium or potassium; $R_1$ is phenyl, pyridyl, pyrrolidyl, morpholinyl, thienyl, furyl, oxazolyl, isoxazolyl, thiazolyl, especially phenyl, $R_2$ and $R_3$ each is hydrogen or lower alkyl, especially methyl or ethyl; $R_4$ is lower alkyl, preferably methyl or t-butyl. When both $R_2$ and $R_3$ are lower alkyl or aralkyl, preferably $R_2$ and $R_3$ represent the same group.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, cyano, carboxy, nitro, amino, di-lower alkylamino and the like. In the case of the last six named substituents there is preferably only one, especially in the para position of the phenyl. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl, p-hydroxyphenyl, p-cyanophenyl, p-carboxyphenyl, p-dimethylaminophenyl and the like.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The heterocyclic groups represented by $R_1$ are 5- to 6-membered monocyclic heterocyclic radicals (exclusive of hydrogen) containing nitrogen, sulfur or oxygen in the ring in addition to carbon (not more than two hetero atoms), and members of this group simply substituted as discussed above with respect to the aryl groups. The heterocyclic radicals include, for example, pyridyl, pyrrolidyl, morpholinyl, thienyl, furyl, oxazolyl, isoxazolyl, thiazolyl, and the like, as well as the simply substituted members, especially the halo, lower alkyl (particularly methyl and ethyl), lower alkoxy (particularly methoxy and ethoxy), phenyl and hydroxy-lower alkyl (particularly hydroxymethyl and hydroxyethyl) substituted members.

The salt forming ions represented by R, $R_2$ and $R_3$ may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

The new α-phosphonoacetylpenicillins of this invention are produced by reacting 6-aminopenicillanic acid or a derivative thereof, e.g., a salt or ester, of the formula (II)
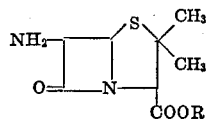

with either an α-phosphonoacetic acid of the formula (III)
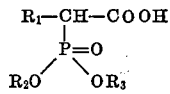

or an α-phosphonoacetyl halide of the formula (IV)
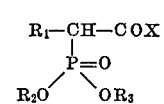

or an activated derivative of the former (III). X is halogen, preferably chlorine or bromine, and the other symbols have the meanings already defined.

The activated derivatives referred to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between 6-aminopenicillanic acid and the α-phosphonoacetic acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexyl-carbodiimide, along with a salt forming organic base, such as triethlamine, pyridine or the like, followed, after an interval by the addition of 6-aminopenicillanic acid or derivative. The product of the reaction is then isolated by conventional procedures, e.g., by concentration or evaporation of the solvent.

The acid halide of formula IV, or an activated derivative of the type described, in an organic solvent such as those referred to above, may be treated with about an equimolar proportion of 6-aminopenicillanic acid or a derivative in the presence of an alkylamine like triethylamine.

When R is the acycloxymethyl group

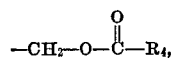

this group may be introduced onto the 6-aminopenicillanic acid moiety either prior to or subsequent to the reaction with the α-phosphonoacetic acid or halide by treatment with one to two moles of a halomethyl ester of the formula (V)          hal—$CH_2OCOR_4$ wherein hal is halogen, preferably chlorine or bromine, in an inert organic solvent such as dimethylformamide, acetone, dioxane, benzene or the like, at about ambient temperature or below.

When $R_2$ and $R_3$ are both aralkyl in a compound of formula I, reduction with hydrogen in the presence of palladium-carbon will yield a product wherein $R_2$ and $R_3$ are both hydrogen, offering another alternative route to products of that structure.

The α-phosphonoacetic acids and acid halides of formulas III and IV may be produced according to the following general method ($R_2$ and $R_3$ are other than hydrogen):

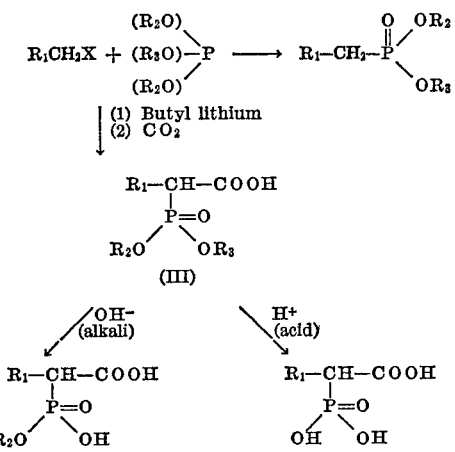

The acid halide is formed from the acid by conventional methods.

In the foregoing flow scheme, X is halogen, preferably chlorine and bromine, and $R_2$ and $R_3$ are lower alkyl or aralkyl only. See Examples 1 to 3 for illustrative details for this synthesis.

An alternative procedure for producing intermediates, of particular interest when $R_1$ is lower alkyl or aralkyl, is according to the following flow scheme:

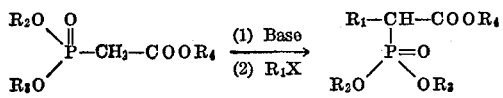

wherein $R_1$, $R_2$, $R_3$ have the same meanings as previously defined and $R_4$ is hydrogen or lower alkyl.

Another alternative procedure is according to the following flow scheme:

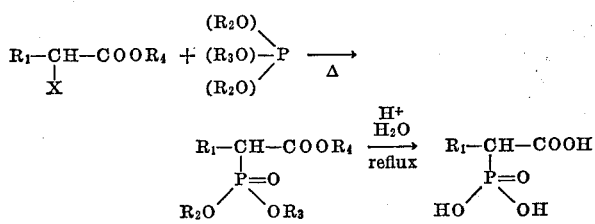

X is halogen, preferably chlorine and bromine and $R_1$, $R_2$, $R_3$ and $R_4$ have the same meaning as above. When $R_2$ and $R_3$ in the product are to be different, it is preferable in the foregoing methods of synthesis to start with a compound in which $R_2$ and $R_3$ are the same, convert the $R_3$ group to hydrogen, by a procedure like the one shown above, and then reesterify the hydroxy group with the appropriate alcohol or alcohol derivative (e.g., its tosylate) containing the desired $R_3$ group.

Intermediates for the preparation of compounds of this invention may also be produced by the methods described by Kreuzkamp et al., Archiv der Pharmazie 294/66, pages 49–56 (1961), and Blicke et al., Jour. Org. Chem. 29, 2036 (1964). See also Kosolapoff, "Organophosphorus Compounds," (Wiley & Sons, New York), pages 121–162 (1950).

Further process details are provided in the illustrative examples.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins. For example, a compound or formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of formula I or a physiologicaly acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1% by weight or such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

Example 1

170.8 gm. of a 15% solution of butyl lithium in hexane are cooled to —60° under a cover of nitrogen. At this temperature a solution of 91.3 gm. of benzylphosphonic acid diethyl ester in 1.14 l. of completely dry tetrahydrofuran is added dropwise (over a period of about two hours). The mixture is stirred an additional 15 minutes and a moderate stream of carbon dioxide is passed into the suspension at −60° for two hours, then it is permitted to stand overnight. The solvent is distilled off and the residue is treated with 300 ml. of water. This is then shaken three times with 200 ml. portions of ether. After concentration of the ether extracts, 54 gm. of a residue is obtained consisting essentially of the starting material, benzylphosphonic acid diethyl ester. The aqueous phase is strongly acidified (pH 0.5) with hydrochloric acid, shaken several times with ether, then the combined ether extracts are washed with distilled water and dried with sodium sulfate. After concentration, 58.8 gm. of a viscous syrup remains which are triturated with petroleum ether and kept in the refrigerator. The product crystallizes after standing overnight in the refrigerator. It is dissolved in a little benzene, the solution is filtered and then carefully treated with petroleum ether. The crystals which form are filtered under suction and dried. 35.2 gm. of α-phosphonophenylacetic acid, P,P-diethyl ester are obtained, m.p. 71–74°.

By starting with benzyl phosphonic acid dibenzyl ester in the above procedure, α-phosphonophenylacetic acid, P,P-dibenzyl ester is obtained, m.p. 124–126°.

The benzylphosphonic acid diethyl ester is prepared by the following procedure which provides a general method: A solution of 16.6 gm. of triethylphosphite and 0.10 mol. of a substituted benzyl chloride in 100 ml. of dimethoxyethane is refluxed for about 1.5 hours. Evaporation of the solvent results in the deposit of the product. The crude ester is purified by distillation at reduced pressure. Substitution of tribenzylphosphite for triethylphosphite gives benzylphosphonic acid dibenzyl ester.

Example 2

2.7 gm. (0.01 mol.) of α-phosphonophenyl acetic acid, P,P-diethyl ester and 25 ml. of 2N sodium hydroxide solution (0.05 mol.) are refluxed for 3 hours. After cooling, it is acidified to pH 0.5 with 2N hydrochloric acid and then shaken with methylene chloride. After the methylene chloride is evaporated off, α-phosphonophenylacetic acid, P-monoethyl ester remains as a syrup.

α-Phosphonophenylacetic acid, P-monobenzyl ester is obtained in the same manner from α-phosphonophenyl acetic acid, P,P-dibenzyl ester.

Example 3

13.6 gm. of α-phosphonophenylacetic acid, P,P-diethyl ester and 100 ml. of concentrated hydrochloric acid are refluxed for 8 hours. The hydrochloric acid is evaporated in a rotary evaporator, the oily residue is dissolved in water and again evaporated. The oily product (11 g.) then solidifies.

The solid residue is dissolved in 20 ml. of isopropanol, the solution is filtered and concentrated to about 15 ml. Upon the addition of benzene, 9.8 g. α-phosphonophenyl acetic acid crystallize, m.p. 177–179°.

According to an alternate procedure the same product is produced as follows:

163.9 gm. of chlorophenylacetic acid ethyl ester and 154 ml. of triethylphosphite are heated at 150° for ten hours. The product is distilled off at reduced pressure to obtain 181 gm. of α-phosphonophenylacetic acid triethyl ester, b.p.$_{0.3mm}$ 158–159°. This product is refluxed with aqueous hydrochloric acid for one hour to obtain the crude product which is purified as described above.

Example 4

2.72 gm. (0.01 mol.) of α-phosphonophenylacetic acid, P,P-diethyl ester are dissolved in 40 ml. of chloroform and treated with 2.06 gm. of dicyclohexylcarbodiimide.

This solution is combined with a mixture made up of 2.16 gm. of 6-aminopenicillanic acid (6-APA), 40 ml. of absolute chloroform and 1.38 gm. of triethylamine and stirred for about 30 minutes prior to combination with the solution. The mixture is stirred overnight at about 15° and separated from the precipitate which comprises essentially dicyclohexylurea, by filtering under suction. The solvent is evaporated from the filtrate at room temperature. The oily residue, 6-(2-phenyl-2-phosphonoacetamido)penicillanic acid, P,P-diethyl ester, is dissolved in 20 ml. of methanol and the solution is treated with 7.5 ml. of a 1.7 N solution of potassium ethylhexanoate in butanol, 2.2 gm. of 6-(2-phenyl-2-phosphonoacetamido) penicillanic acid, P,P-diethylester, potassium salt, are obtained.

To purify the produce and remove a slight amount of 6-aminopenicillanic acid, the salt is dissolved in a little water, layered with ether and acidified with citric acid at 0° with stirring. The layers are separated, the aqueous portion is again extracted with ether, the combined ether solutions are washed with water, dried with magnesium sulfate and concentrated under vacuum. The residual syrup is dissolved in methanol, potassium ethylhexanoate dissolved in n-butanol, is added and the purified salt is precipitated by the addition of ether with stirring, m.p., 118° (dec.).

By utilizing the monoethyl ester, monobenzyl ester and dibenzyl ester, respectively, of Examples 1 and 2, the monoethyl, monobenzyl and dibenzyl esters of 6-(2-phenyl-2-phosphonoacetamido)penicillanic acid are obtained.

The following additional products having the formula in the right hand side of the table are obtained by the procedure of Example 4 from starting materials having the formula in the left hand part of the table:

TABLE

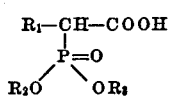 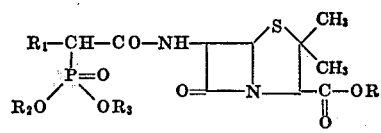

| Example | $R_1$ | $R_2$ | $R_3$ | R | $R_1$ | $R_2$ | $R_3$ |
|---|---|---|---|---|---|---|---|
| 5 | H | $CH_3$ | $CH_3$ | $CH_3$ | H | $CH_3$ | $CH_3$ |
| 6 | $CH_3$ | $C_2H_5$ | H | $C_2H_5$ | $CH_3$ | $C_2H_5$ | H |
| 7 | $C_3H_7$ | $C_3H_5$ | $C_2H_5$ | $CH_3$ | $C_3H_7$ | $C_2H_5$ | $C_2H_5$ |
| 8 | $C_6H_5CH_2$ | $C_6H_5CH_2$ | $C_6H_5CH_2$ | $CH_2O\overset{O}{\underset{\|}{C}}-CH(CH_3)_2$ | $C_6H_5CH_2$ | $C_6H_5CH_2$ | $C_6H_5CH_2$ |
| 9 | 4-$ClC_6H_4$ | H | H | $-CH_2O\overset{O}{\underset{\|}{C}}-C_6H_5$ | 4-$ClC_6H_4$ | H | H |
| 10 | 3,4-$(CH_3O)_2C_6H_3$ | $C_2H_5$ | $C_2H_5$ | $C_2H_5$ | 3,4-$(CH_3O)_2C_6H_3$ | $C_2H_5$ | $C_2H_5$ |
| 11 | 3,4,5-$(CH_3O)_3C_6H_2$ | $C_2H_5$ | $C_2H_5$ | $C_2H_5$ | 3,4,5-$(CH_3O)_3C_6H_2$ | $C_2H_5$ | $C_2H_5$ |
| 12 | 4-$CH_3C_6H_4$ | Na | Na | Na | 4-$CH_3C_6H_4$ | Na | Na |
| 13 | 3,4-$(Br)_2C_6H_3CH_2$ | H | H | $C_2H_5$ | 3,4-$(Br)_2C_6H_3CH_2$ | H | H |
| 14 | 2,4-$(Cl)_2C_6H_3$ | $C_2H_5$ | H | $C_2H_5$ | 2,4-$(Cl)_2C_6H_3$ | $C_2H_5$ | H |

TABLE—Continued

| | $R_1-CH-COOH$ $P=O$ $R_2O \quad OR_3$ | | | | $R_1-CH-CO-NH-$ [β-lactam with S, CH₃, CH₃, C-OR] $P=O$ $R_2O \quad OR_3$ | | |
|---|---|---|---|---|---|---|---|
| Example | $R_1$ | $R_2$ | $R_3$ | R | $R_1$ | $R_2$ | $R_3$ |
| 15 | $C_6H_5$-isoxazolyl-CH₃ | $C_2H_5$ | $C_2H_5$ | $C_2H_5$ | $C_6H_5$-isoxazolyl-CH₃ | $C_2H_5$ | $C_2H_5$ |
| 16 | morpholino | $C_2H_5$ | $C_2H_5$ | $C_2H_5$ | morpholino | $C_2H_5$ | |
| 17 | $CH_3$-pyridyl | $C_2H_5$ | $C_2H_5$ | $C_2H_5$ | $CH_3$-pyridyl | $C_2H_5$ | $C_2H_5$ |
| 18 | thienyl | $C_2H_5$ | $C_2H_5$ | $C_2H_5$ | thienyl | $C_2H_5$ | $C_2H_5$ |
| 19 | furyl | $C_6H_5CH_2$ | $C_6H_5CH_2$ | $C_6H_5CH_2$ | furyl | $C_6H_5CH_2$ | $C_6H_5CH_2$ |
| 20 | $C_6H_5$ | $C_6H_5$ | $C_6H_5$ | $CH_2O-CO-CH(CH_3)_2$ | $C_6H_5$ | $C_6H_5$ | $C_6H_5$ |
| 21 | $C_6H_5$ | $N(C_2H_5)_3$ | $N(C_2H_5)_3$ | $N(C_2H_5)_3$ | $C_6H_5$ | $N(C_2H_5)_3$ | $N(C_2H_5)_3$ |
| 22 | $C_6H_5$ | Na | Na | Na | $C_6H_5$ | Na | Na |

What is claimed is:

1. A compound of the formula

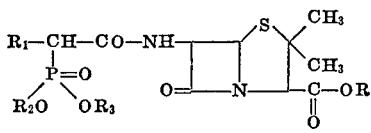

wherein R is hydrogen, lower alkyl, aralkyl,

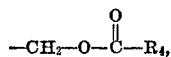

aluminum, alkali metal, alkaline earth metal or amine salt ion; $R_1$ is thienyl; $R_2$ and $R_3$ each is hydrogen, aluminum, alkali metal, alkaline earth metal, amine salt ion, lower alkyl, aryl, or aralkyl; and $R_4$ is lower alkyl; each aryl group being monocyclic carbocyclic aryl.

2. A compound as in Claim 1 wherein R is hydrogen, lower alkyl, alkali metal or

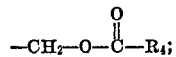

$R_2$ and $R_3$ each is hydrogen or lower alkyl and $R_4$ is lower alkyl.

3. A compound as in Claim 1 wherein R is hydrogen.

4. A compound as in Claim 1 wherein $R_2$ and $R_3$ each is ethyl.

5. A compound as in Claim 1 wherein R, $R_2$ and $R_3$ each is ethyl.

6. A compound as in Claim 1 wherein $R_2$ and $R_3$ each is lower alkyl.

7. A compound as in Claim 1 wherein $R_2$ and $R_3$ each is alkali metal ion.

8. A compound as in Claim 1 wherein $R_2$ is hydrogen and $R_3$ is lower alkyl.

9. A compound as in Claim 1 wherein $R_2$ and $R_3$ each is phenyl-lower alkyl.

10. A compound as in Claim 1 wherein $R_2$ is phenyl-lower alkyl and $R_3$ is hydrogen.

11. The alkali metal salt of the compound of Claim 4.

References Cited

UNITED STATES PATENTS

| | | | |
|---|---|---|---|
| 3,118,878 | 1/1964 | Nayler et al. | 260—239.1 |
| 3,144,444 | 8/1964 | Koe | 260—239.1 |
| 3,558,601 | 1/1971 | Ekström et al. | 260—239.1 |

NICHOLAS S. RIZZO, Primary Examiner

U.S. Cl. X.R.

424—271

UNITED STATES PATENT OFFICE
CERTIFICATE OF CORRECTION

Patent No. 3,825,529    Dated July 23, 1974

Inventor(s) Joseph Edward Dolfini et al.

It is certified that error appears in the above-identified patent and that said Letters Patent are hereby corrected as shown below:

Column 6, line 34, delete "produce" and insert -- product --.
Column 7, Example 15 in the Table under $R_2$ and $R_3$ delete "$C_2O_5$" and insert -- $C_2H_5$ --.
Column 8, Example 16 in the Table under $R_3$ insert -- $C_2H_5$ --.
Column 8, line 35 delete "Claim 1" and insert --Claim 3--.

Signed and sealed this 1st day of July 1975.

(SEAL)
Attest:

RUTH C. MASON
Attesting Officer

C. MARSHALL DANN
Commissioner of Patents
and Trademarks